(12) United States Patent
Silverbrook et al.

(10) Patent No.: US 6,835,135 B1
(45) Date of Patent: Dec. 28, 2004

(54) VIDEO GAMING CONSOLE WITH INTEGRAL PRINTER DEVICE

(75) Inventors: Kia Silverbrook, Balmain (AU); Tobin Allen King, Cremorne (AU)

(73) Assignee: Silverbrook Research PTY LTD, Balmain (AU)

( * ) Notice: Subject to any disclaimer, the term of this patent is extended or adjusted under 35 U.S.C. 154(b) by 0 days.

(21) Appl. No.: 09/437,007

(22) Filed: Nov. 9, 1999

(30) Foreign Application Priority Data

Nov. 9, 1998 (AU) .............................................. PP7020

(51) Int. Cl.[7] .................................................. A63F 9/24
(52) U.S. Cl. .......................................... 463/30; 463/1
(58) Field of Search ................................ 463/1, 30, 36, 463/39, 43, 44, 45; 273/148 R

(56) References Cited

U.S. PATENT DOCUMENTS

| | | | | |
|---|---|---|---|---|
| 3,843,132 A | * | 10/1974 | Ferguson | |
| 4,890,832 A | * | 1/1990 | Komaki | |
| 4,904,100 A | * | 2/1990 | Enix | |
| 5,291,243 A | * | 3/1994 | Heckman et al. | |
| 5,419,543 A | * | 5/1995 | Nakamura et al. | |
| 5,462,375 A | * | 10/1995 | Isobe et al. | |
| 5,559,932 A | * | 9/1996 | Machida et al. | |
| 5,566,290 A | * | 10/1996 | Silverbrook | |
| 5,665,249 A | * | 9/1997 | Burke et al. | |
| 5,666,141 A | * | 9/1997 | Matoba et al. | |
| 5,678,001 A | * | 10/1997 | Nagel et al. | |
| 5,718,631 A | | 2/1998 | Invencion | |
| 5,768,382 A | * | 6/1998 | Schneier et al. | |
| 5,802,274 A | | 9/1998 | Dorak et al. | |
| 5,816,918 A | * | 10/1998 | Kelly et al. | |
| 5,829,745 A | * | 11/1998 | Houle | |
| 5,931,467 A | * | 8/1999 | Kamille | |
| 6,012,832 A | | 1/2000 | Saunders et al. | |

OTHER PUBLICATIONS

'Math Adventure' & 'Word Adventure' by 7th Level with Summary within Packard Bell Software Collection list of titles, 35pp, (c) 1996.*

* cited by examiner

*Primary Examiner*—Mark Sager

(57) ABSTRACT

A video gaming console (and corresponding method of printing gaming information onto a substrate) is configured to accept gaming data on a detachable CD-ROM, cartridge or the like. A user plays the game via a controller device. At predetermined points in the game, such as a certain level being achieved or a task being completed, an integral printing apparatus prints gaming images. Enhanced interactivity is achieved.

64 Claims, 12 Drawing Sheets

VIDEO GAMING CONSOLE WITH INTEGRAL PRINTER DEVICE

FIELD OF THE INVENTION

The present invention relates to the field of video games and, more particularly, to a video games console having an integral compact printer device.

SUMMARY OF THE INVENTION

In accordance with a first aspect of the present invention, there is provided a video gaming device, including a casing that includes a receptacle for accepting detachable storage means, the detachable storage means containing an interactive program, the casing incorporating:

communication means for receiving interaction data from at least one control device operable by a user;

processing means for executing said interactive program at least partially in reliance upon the interaction data, thereby to generate display images for output to an image display means; and a printer apparatus including a printhead, a print media feed mechanism and a replaceable cartridge, an ink supply unit and print media supply housed jointly in said replaceable cartridge, said printer apparatus being operatively associated with said processing means to print one or more gaming images onto print media in response to execution of said interactive program.

In the preferred form, the device is designed for use with a detachable controller module that includes a variety of interactive control devices such as joysticks and control buttons etc. This controller may communicate with the device by wireless communication means such as the new "Bluetooth" system or by cable or other suitable communication means.

In the preferred form, the print media is in the form of sheets of paper or card.

In one particularly preferred form, the replaceable cartridge includes a print media feed roller device that interacts with a non-replaceable print media feed mechanism provided within the device.

Desirably, the interactive program is activated to print out images via the printer apparatus at certain predetermined positions in the program.

The printer apparatus preferably comprises an ink jet printer that is optionally in the form of a pagewidth array of ink ejection nozzles which eject ink by means of a series of actuators. Preferably, the actuators are thermal bend actuators.

In a preferred form, the detachable program storage means is in the form of a Digital Video Disk also known as a Digital Versatile Disk (DVD) executable by a DVD player. In other similarly preferred forms CD-ROMs and semiconductor memory cartridges can be used in place of DVDs with appropriate drives or connectors, hardware and software.

BRIEF DESCRIPTION OF THE DRAWINGS

A preferred embodiment of the invention will now be described, by way of example only, with reference to the accompanying drawings in which.

DESCRIPTION OF PREFERRED AND OTHER EMBODIMENTS

In the illustrated preferred embodiment, there is provided a video game player which includes an integral printer which is able to print out, preferably on business card sized cards, information which enhances the interactivity of the video game.

Figure 1:
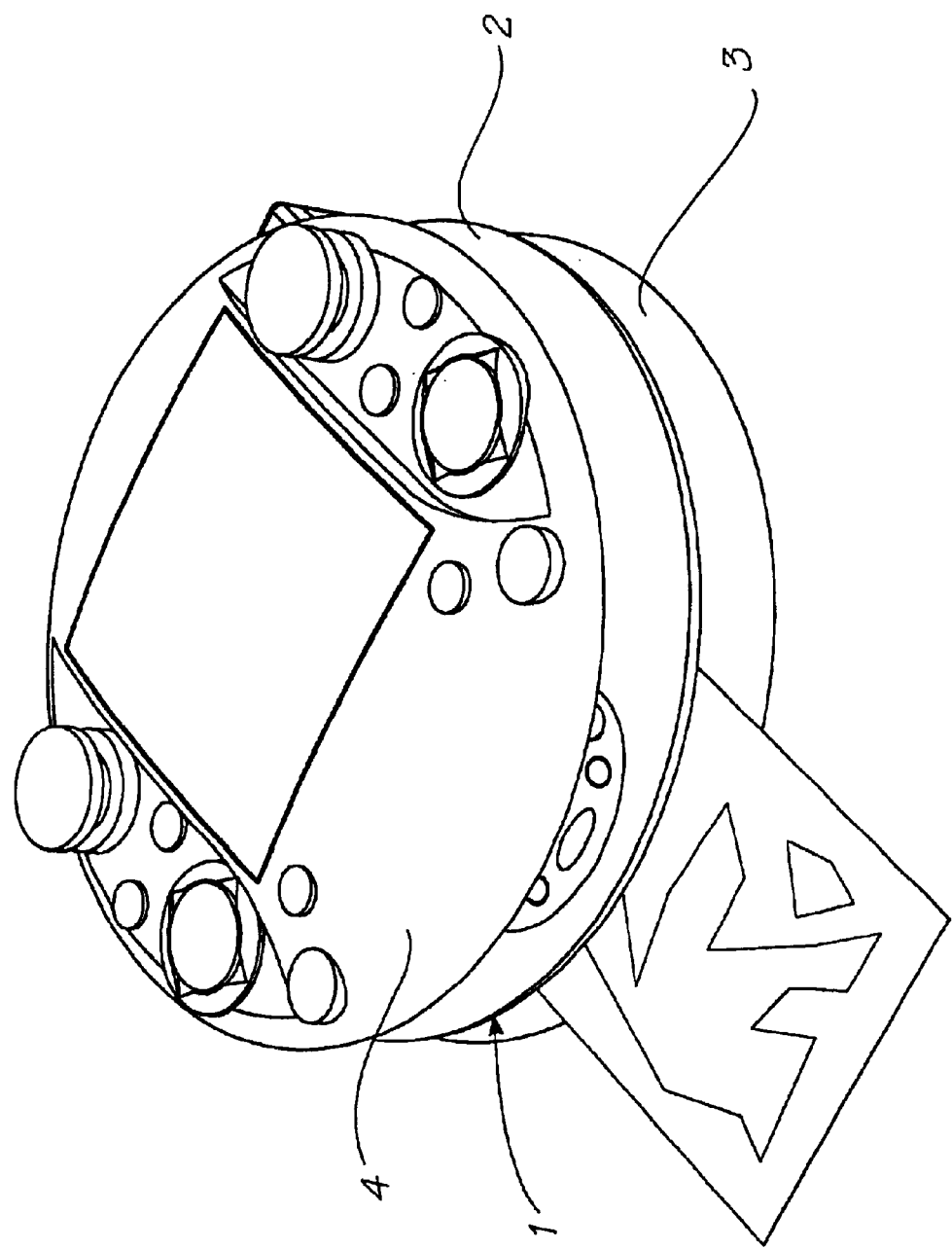
FIG. 1 is a front perspective view of a first embodiment video game console according to the invention with detachable controller module, illustrating a printed card being ejected from the integral printer.
Figure 2:
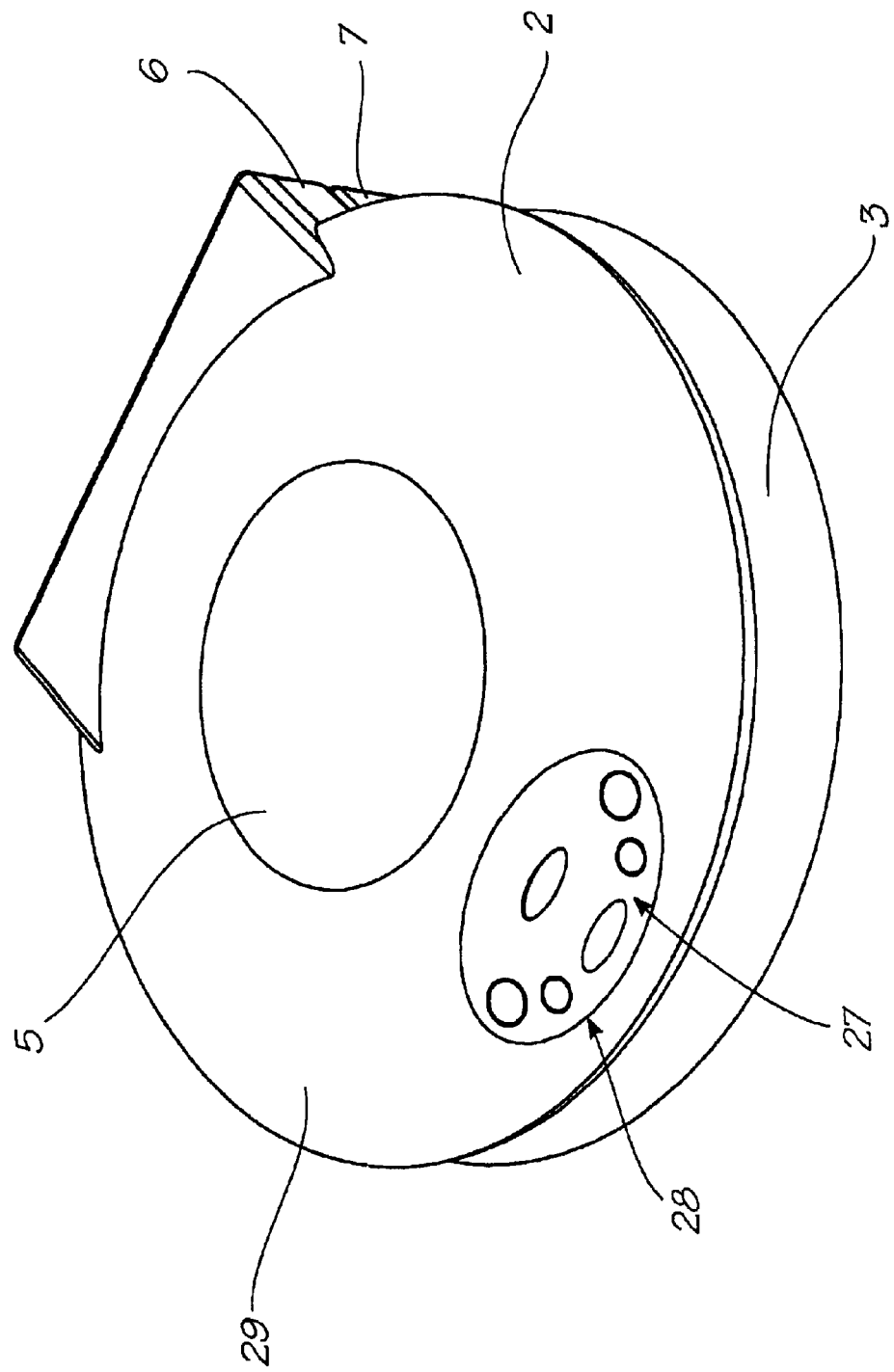
FIG. 2 is a front perspective view of the console comprising printer module and DVD module with the top controller module removed.

Turning to the figures, there is shown a video game console 1 comprising a printer module 2 and Digital Video Disk (DVD) player module 3. Connected to the console is an optional detachable controller module 4 as shown in FIG. 1. The detachable controller module can communicate with the console by any suitable means including wireless systems such as "Bluetooth" or cable etc. and can be releasably secured to the console by any suitable means including magnetic coupling 5 or mechanical interlocking.

Figure 3:
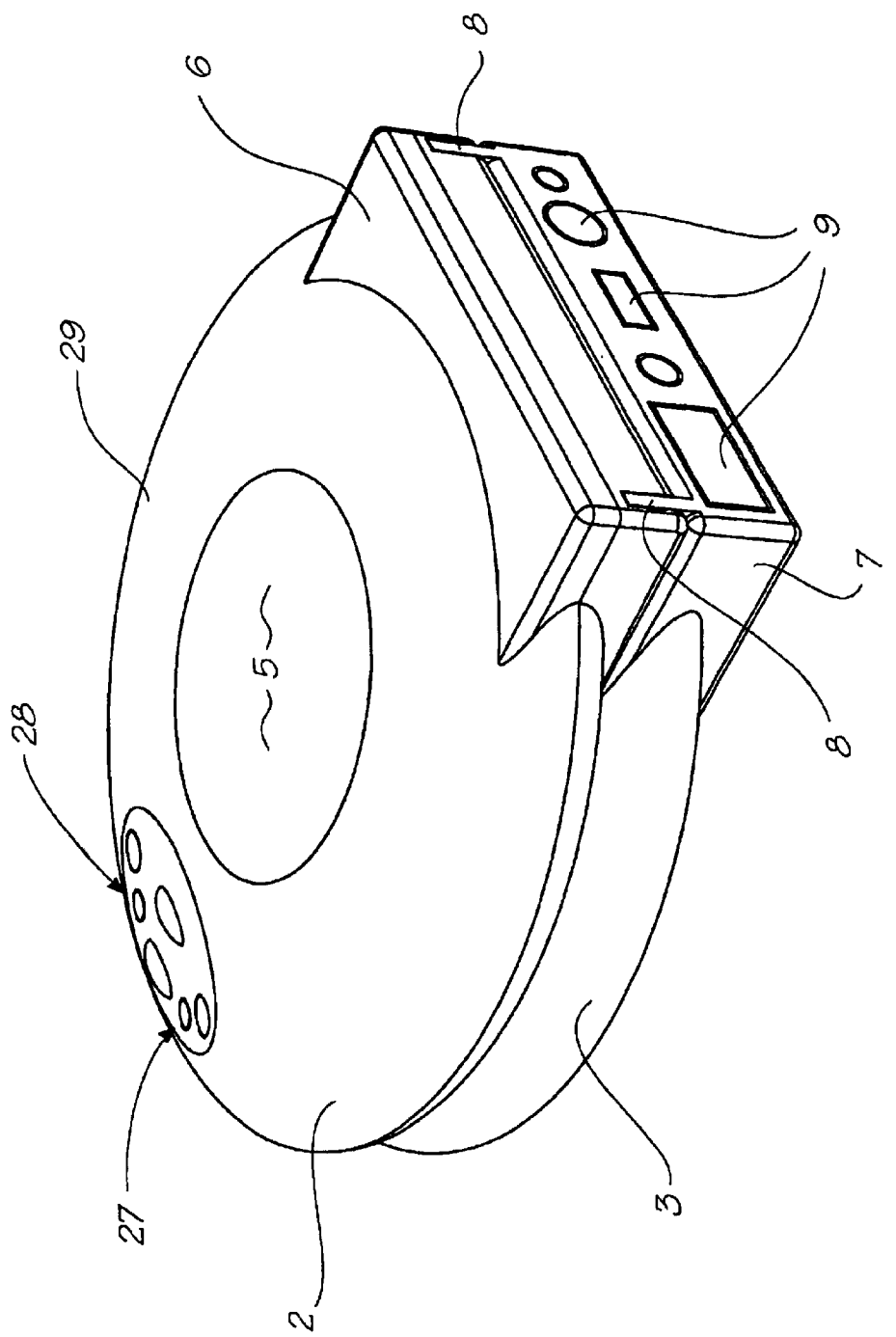
FIG. 3 is a rear perspective of the console shown in FIG. 2.
Figure 4:
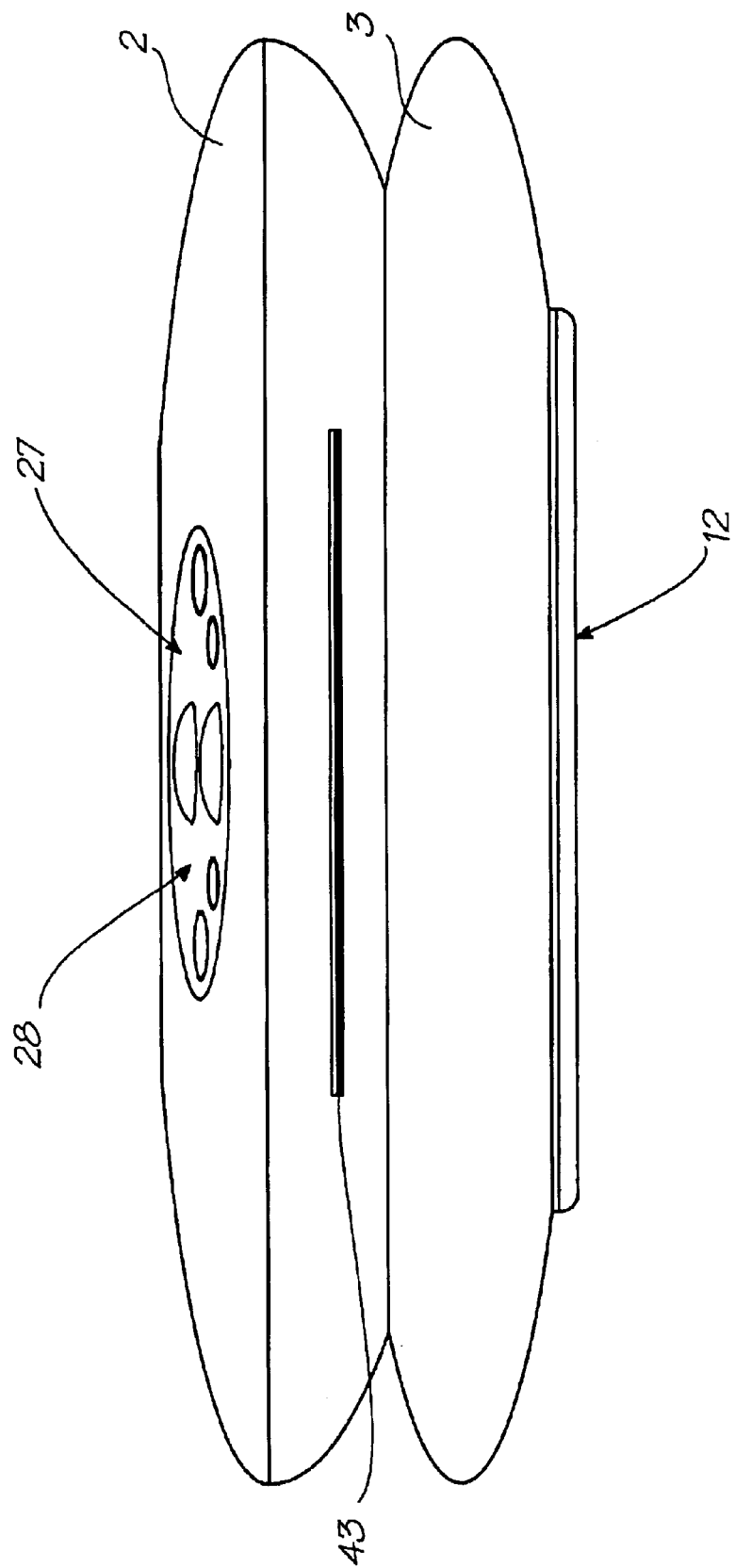
FIG. 4 is a front view of the console shown in FIGS. 2 and 3.
Figure 5:
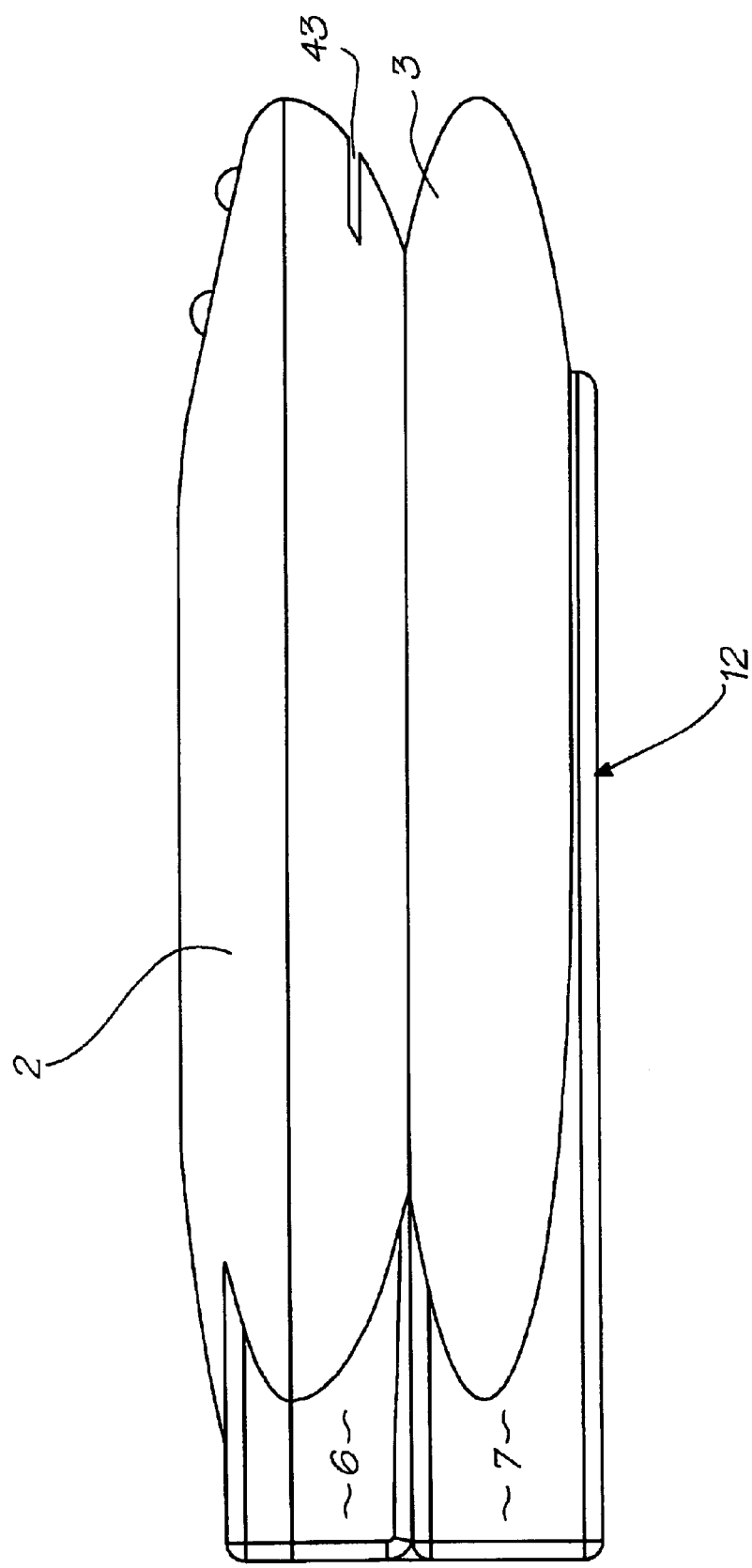
FIG. 5 is a side view of the console assembly shown in FIG. 4.
Figure 6:
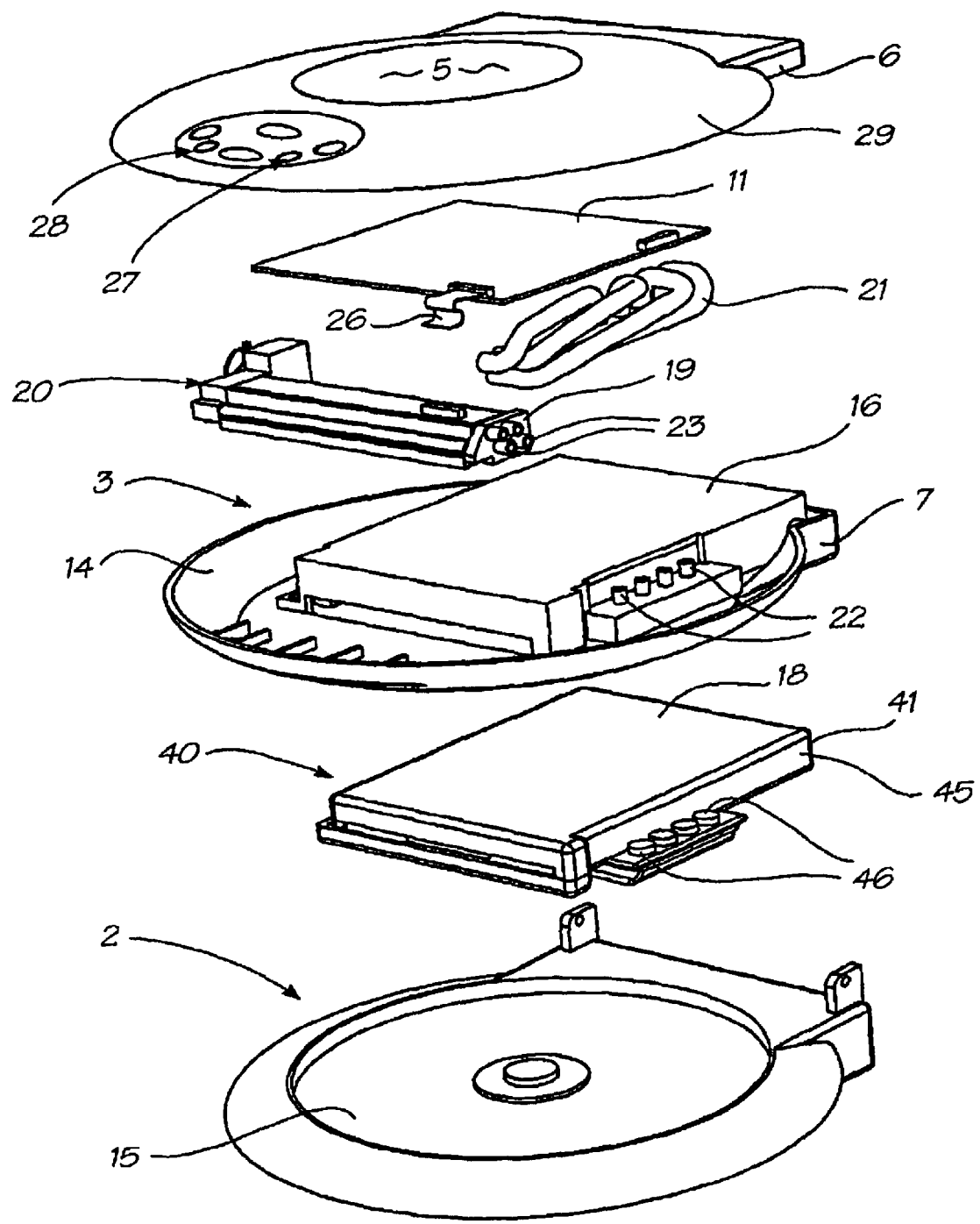
FIG. 6 is an exploded front perspective view of the console assembly shown in FIGS. 2 to 5.
Figure 7:
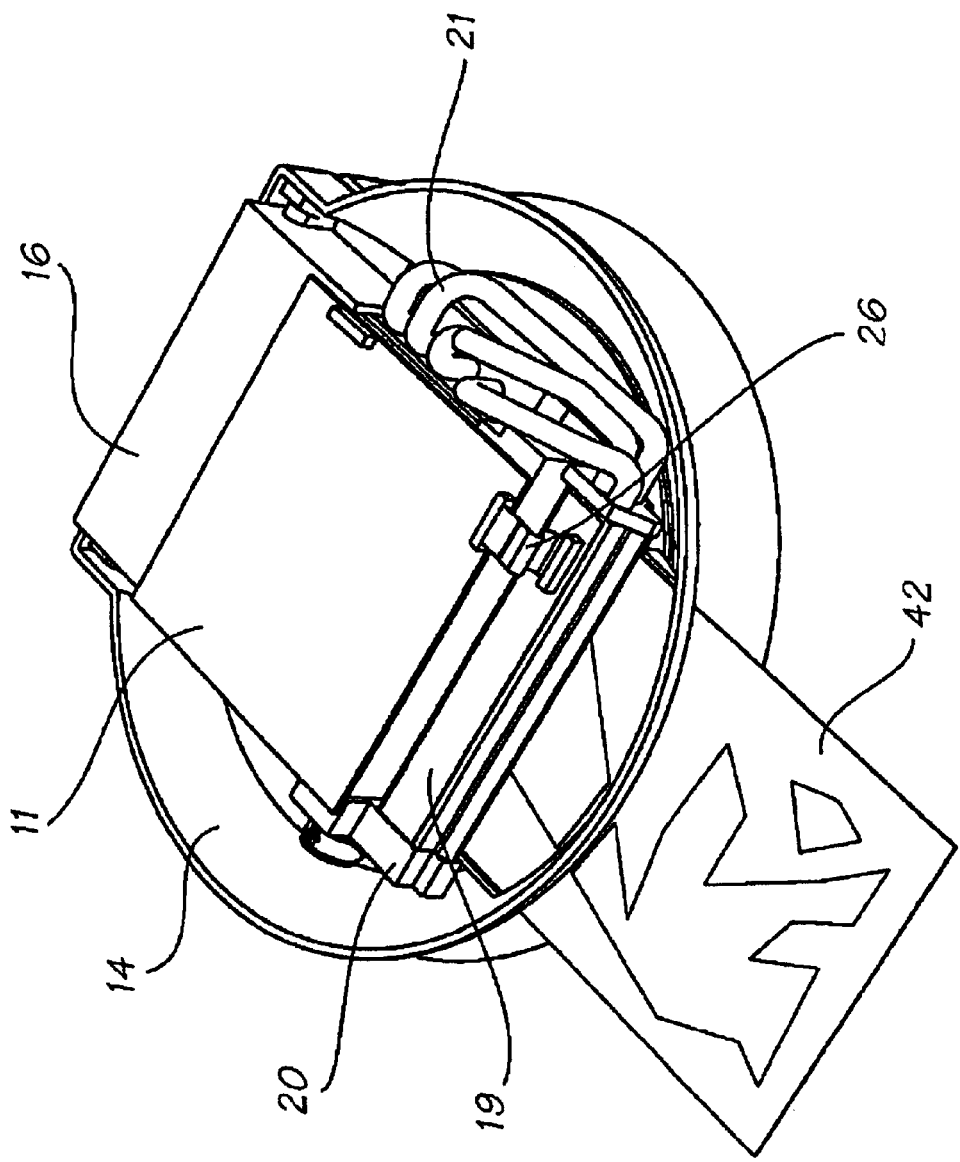
FIG. 7 is a front perspective view of the console with the printer module top cover removed.

The printer module 2 and DVD player module 3 are interconnected by means of connecting housing extensions 6 and 7 which hinge about pivots 8 as shown in FIG. 3. The lower connecting extension 7 preferably includes various input/output connectors and ports 9 for optionally connecting joysticks and other interactive devices. A video outlet port 50 is also provided for connection with standard video type devices as is common in the art. Further ports can also be provided for an external power source or other devices such as sound systems to be interconnected to the console.

The DVD player module 3 is able to accept storage means in the form of standard DVD game discs 10 as is becoming popular in the industry. The DVD player is interconnected to a high-end processor 51, which can be constructed along similar lines to standard high-end video game processors. The processor in turn utilizes memory 52 for standard video game functions and interacts with a print controller chip 53, which is also preferably housed with the high-end processor on PCB 11 within the printer module 2. The controller chip 53 can be structured along the lines set out in U.S. Pat. No.

6,512,596. Batteries for driving the console are preferably located in the base of the DVD player module as shown by arrow 12.

The printer module 2 is preferably constructed so as to simultaneously provide a closure for the DVD player module 3. This is achieved by hinging the printer unit to the DVD module as shown. The printer module 2 comprises a base molding 14 that is configured to fully enclose a DVD disk receiving compartment 15 formed in the upper surface of the DVD player module 3. The base molding 14 is further configured to define an integral chassis structure 16 adapted on its under side to receive and locate an ink and paper cartridge 18.

The upper surface of the chassis structure 16 is configured to support a printhead and ink distribution assembly 19, print media feed mechanism 20, and ink connecting hoses 21, the latter linking ink outlet nozzles 22 on the chassis with ink inlet nozzles 23 provided on the printhead and ink distribution assembly 19. The printer and DVD control PCB 11 is also supported on the chassis 16 and has flexible connections 26 extending therefrom to interconnect the DVD and printer control buttons 27 and 28 provided on a top cover moulding 29.

Figure 8:
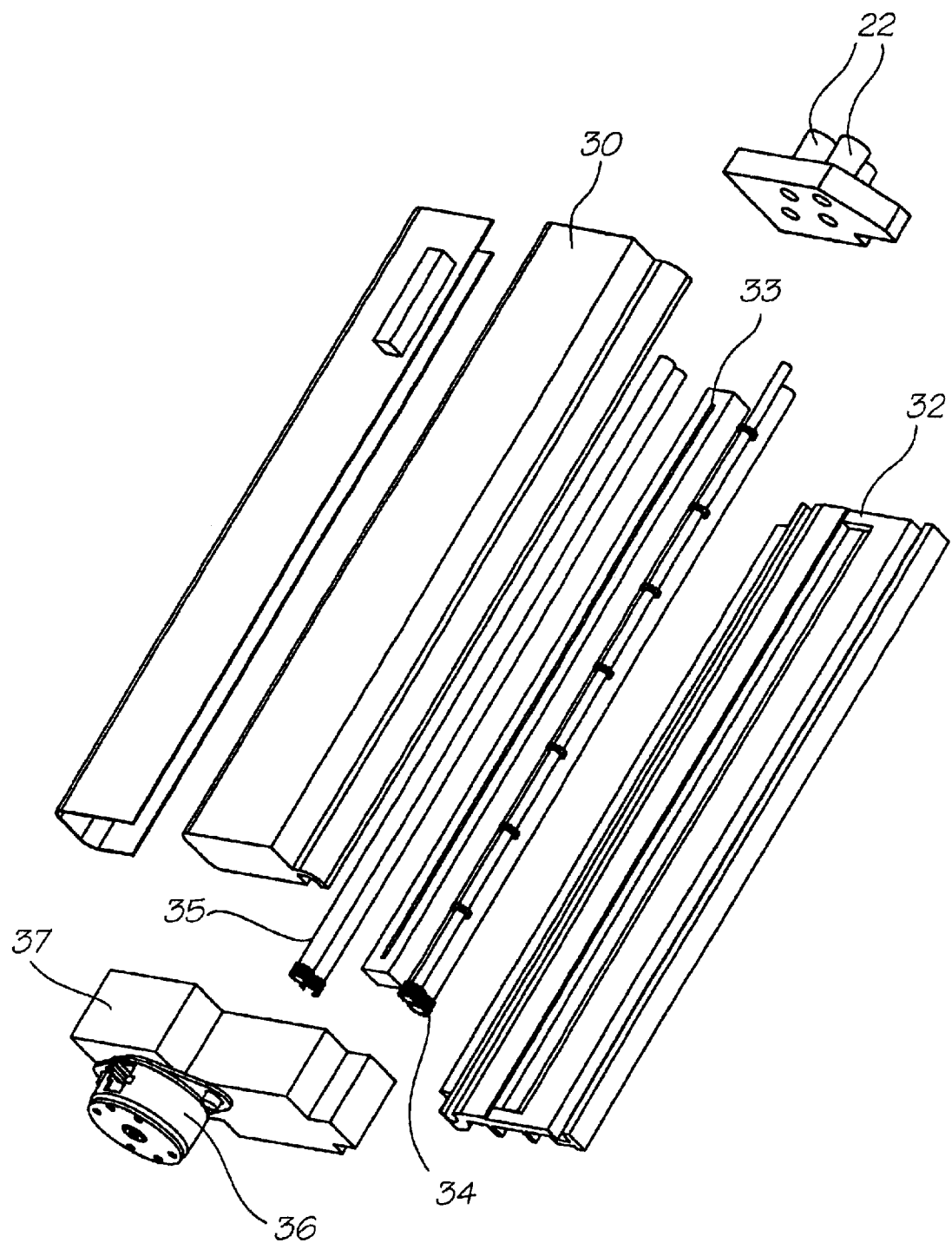
FIG. 8 is an exploded perspective view of the printer apparatus including the printhead, print media feed mechanism and printhead ink distribution assembly but excluding the ink supply.
Figure 9:
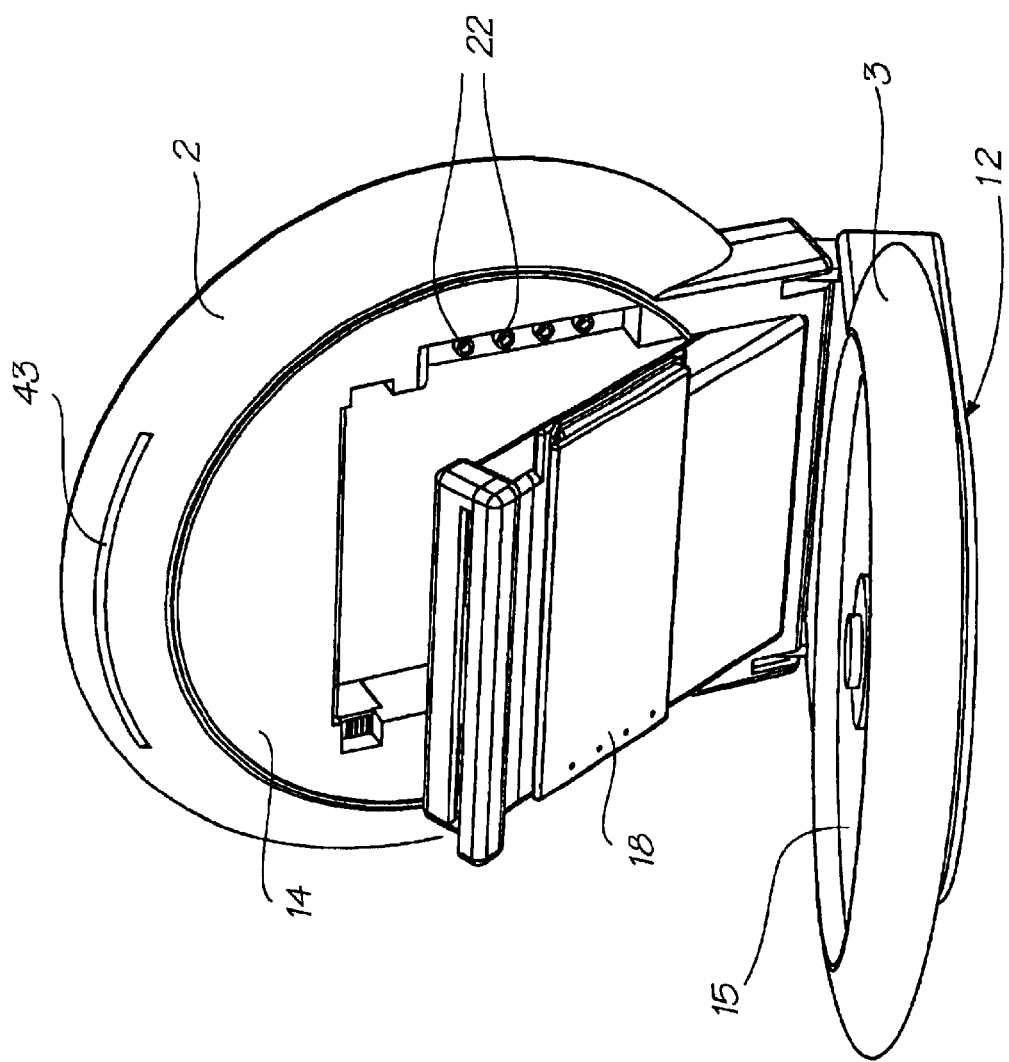
FIG. 9 is a front perspective view of the console showing the printer module in the raised position for insertion of the print media and ink supply cartridge.
Figure 10:
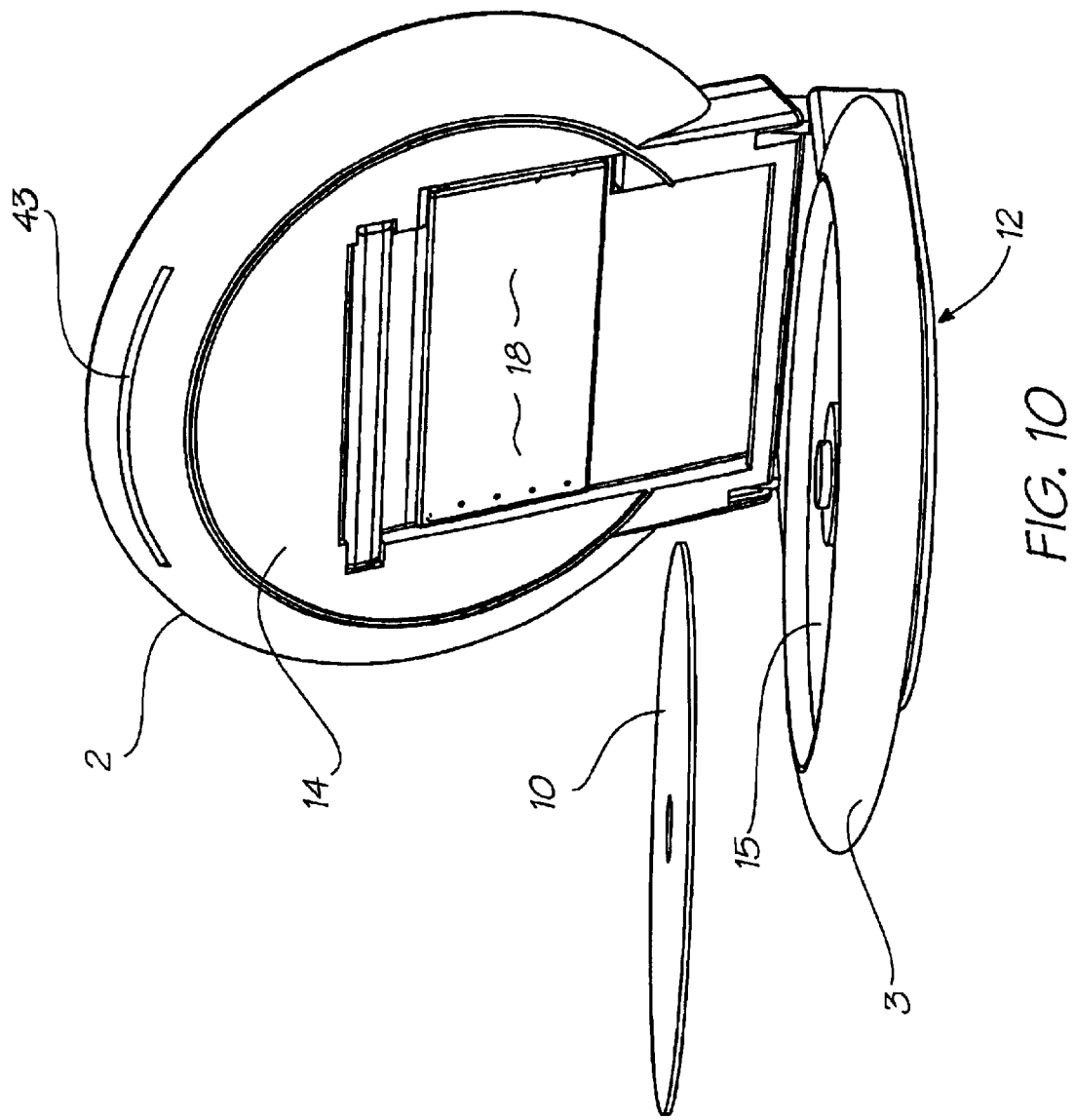
FIG. 10 is a schematic view of the assembly shown in FIG. 9 illustrating insertion of a DVD into the DVD player module.
Figure 11:
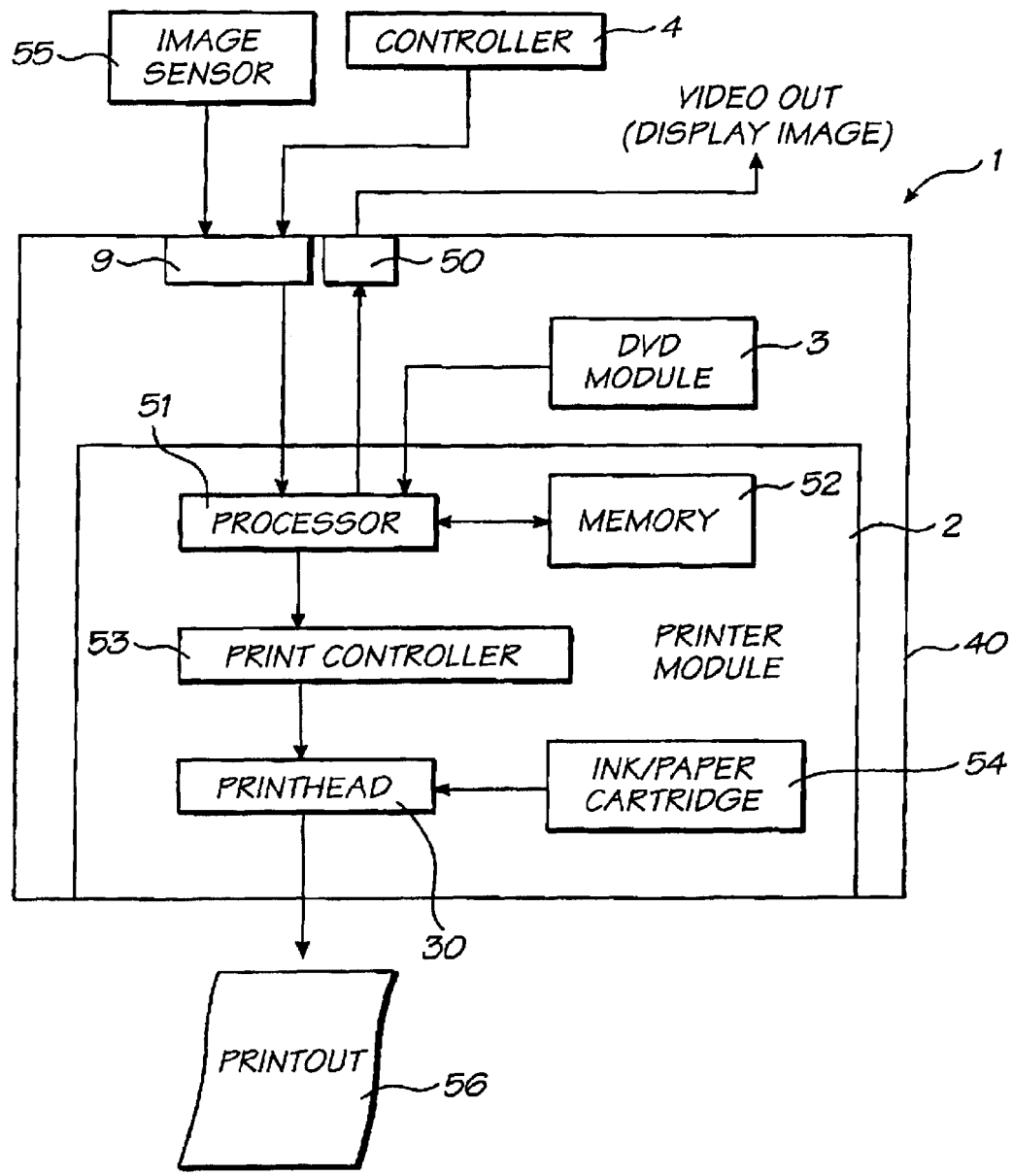
FIG. 11 is a block diagram showing components of the video gaming device of FIG. 1.
Figure 12:
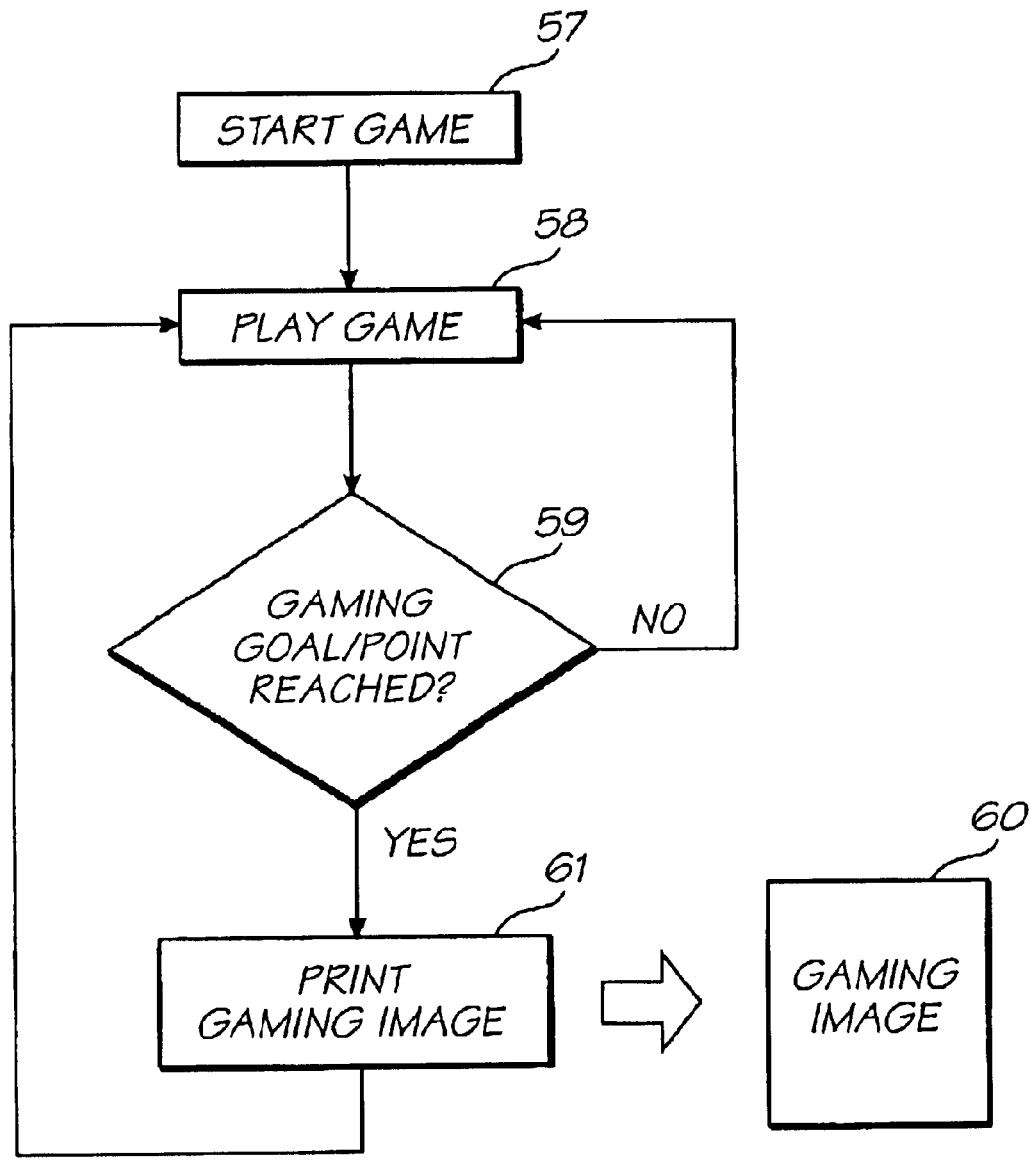
FIG. 12 is a flowchart showing steps involved in implementation of a preferred embodiment of the invention.

Details of the printhead, ink distribution assembly and print media feed means are best illustrated in FIG. 8. The printhead, which is preferably in the form of a pagewidth ink jet printhead chip, is packaged with an ink distribution unit and printhead cover into a printhead module 30. This module 30 is supported on a printhead chassis molding 32, and further includes a printhead capping mechanism 33, paired drive rollers 34 and 35, stepper motor 36 and an associated gear box 37 that engages the drive rollers 34 and 35.

The preferred ink and paper cartridge is preferably in accordance with that described in the applicant's U.S. Pat. No. 6,626,529 the contents of which are incorporated herein by reference. In the alternate embodiment illustrated in the accompanying drawings the ink and paper cartridge 54 comprises a cartridge casing 40 defining an upper print media storage region 41 adapted to hold a stack of paper cards or sheet 42. A card-dispensing outlet is shown at 43. The lower portion of the cartridge casing 40 defines an ink supply region 45 that is separated internally into four sections each of which connect with piercable ink supply outlets 46. Upon installation, these outlets 46 are pierced by formations in the underside of the base moulding so that ink flows from the cartridge to the outlet nozzles on the chassis 16, via connecting hoses 21, to the printhead and ink distribution assembly 19.

In yet another embodiment, the printer unit and print media container can be snap fitted into the console.

In use, the console is connected to a video device and a DVD 48 is inserted into the DVD player module 3. Appropriate controllers are then selected. These may be the detachable controller module 4 as shown in FIG. 1, or alternatively other external interactive controllers. The printer can then be operated during execution of the program in the DVD either manually or automatically as discussed in more detail below.

It will be evident to those skilled in the art that the preferred embodiment provides for a video game system enabling print on demand cards 56. These cards can be utilized for a number of purposes. Firstly, the video game can, at certain predetermined levels, print out a series of brag cards'. These can provide a high-resolution picture that can only be achieved at a certain point in the game. The brag cards can be personalised with the game players name, score, chosen character, accumulated wealth or objects, etc. The cards could also include a photographic likeness where the video game arrangement includes an optional image sensor 55. With such an option, the brag cards could also be personalised with a photographic likeness mapping on to 3D characters etc.

The DVD player can be adapted to play standard DVD movies in addition to being configured to read CD-ROMs so as to provide information from encyclopaedias, maps etc provided by other CD-ROMs or DVD disks. In this manner, images from DVD movies and information from such CD-ROM or DVD repositories can be printed out. It should be noted that while the preferred form uses a DVD player or drive, the interactive programs may be stored on CD-ROM or on semiconductor memory cartridges, the latter being popularly used with pocket sized prior art video game devices.

Additionally, although the preferred embodiment described is designed for optional use with non portable external display and control devices, the game storage medium, controls, game processor, screen, audio and printer may all be housed in the same housing, and this may be pocket sized if required.

Where educational software is provided, the printer can be utilized to print out standard award certificates or diplomas upon reaching various levels. Such a system provides for an ideal incentive for children utilizing the system to become further involved in educational software running on the system. The utilization of the printer also allows parents to monitor children in the utilization of the device through, for example, the demanding of certain information or diploma certificates being printed out at various steps before the device is able to be utilized as a game playing machine. The arrangement can be synergistic between the game playing and educational software, where the educational software prints out a code or clue for utilization by the user in playing the games. Of course, many other interactive uses can be provided.

It will be appreciated by those skilled in the art that numerous variations and/or modifications may be made to the present invention as shown without departing from the spirit or scope of the invention as broadly described. Accordingly, the present embodiment is to be considered in all respects to be illustrative and not restrictive.

We claim:

1. A video gaming device, including a casing that includes a receptacle for accepting detachable storage means, the detachable storage means containing an interactive program, the casing incorporating:

communication means for receiving interaction data from at least one control device operable by a user;

processing means for executing said interactive program at least partially in reliance upon the interaction data, thereby to generate display images for output to an image display means; and a printer apparatus including a printhead, a print media feed mechanism and a replaceable cartridge, an ink supply unit and print media supply housed jointly in said replaceable cartridge, said printer apparatus being operatively associated with said processing means to print one or more gaming images onto print media in response to execution of said interactive program.

2. A video gaming device according to claim 1, wherein said print media is in the form of sheets of paper or card.

3. A video gaming device as claimed in claim 2, wherein said sheets are substantially business card size.

4. A video gaming device according to claim 1, wherein said cartridge includes a print media feed roller device for interacting with the print media feed mechanism to feed media from the cartridge to the printhead as required.

5. A video gaming device as claimed in claim 1, wherein said one or more gaming images are printed via said printer at one or more points of said interactive program.

6. A video gaming device as claimed in claim 1, wherein said one or more points are predetermined gaming events defined by the interactive program.

7. A video gaming device as claimed in claim 6, wherein said one or more points are reached upon successful completion of a gaming goal by a user or users.

8. A video gaming device as claimed in claim 1, wherein said printhead comprises an inkjet printhead.

9. A video gaming device as claimed in claim 8, wherein said ink jet printhead comprises a pagewidth array of ink ejection nozzles configured to selectively eject ink by means of a series of actuators.

10. A video gaming device as claimed in claim 9, wherein said actuators are thermal bend actuators.

11. A video gaming device as claimed in claim 8, wherein said printhead is a microelectromechanical system (MEMS) printhead.

12. A video gaming device as claimed in claim 1, wherein said detachable storage means comprises a Digital Video Disk (DVD) executable by a DVD player module.

13. A video gaming device as claimed in claim 1, wherein said detachable program storage means comprises a compact disk-read only memory (CD-ROM).

14. A video gaming device as claimed in claim 1, wherein said detachable program storage means comprises a semiconductor memory cartridge.

15. A video gaming device as claimed in claim 1, wherein said communication means comprises a wireless communication system.

16. A video gaming device as claimed in claim 1, including a detachable controller module incorporating a variety of interactive control devices.

17. A video gaming device as claimed in claim 16, wherein said controller module is releasably connected with said console by means of a magnetic coupling.

18. A video gaming device as claimed in any one of claims 1, 2, 3, 4 to 5, wherein the gaming images are different to the corresponding display images.

19. A video gaming device as claimed in any one of claims 1, 2, 3, 4 to 5, wherein the gaming images include interaction information that can be utilized by the user to change, or continue along, the course of the interactive program.

20. A video gaming device as claimed in any one of claims 1, 2, 3, 4 to 5, wherein the gaming images are indicative of successful completion of a predetermined task or level of the interactive program.

21. A video gaming device as claimed in claim 20, wherein the gaming images take the form of one or more certificates.

22. A video gaming device as claimed in claim 21, wherein the certificate includes information indicative of a score or a user that attained the certificate.

23. Video game apparatus including:
   a receptacle for accepting detachable storage means, the detachable storage means containing interactive program;
   communication means for receiving interaction data from at least one control device operable by a user;
   processing means for executing said interactive program at least partially in reliance upon the interaction data, thereby to generate display images for output to an image display means; and
   a printer apparatus including a printhead, a print media feed mechanism and a replaceable cartridge, an ink supply unit and print media supply housed jointly in said replaceable cartridge, said printer apparatus being operatively associated with said processing means to automatically print one or more gaming images onto print media at one or more predetermined points during execution of the interactive program.

24. Video game apparatus as claimed in claim 23, wherein the gaming images are different to the corresponding display images of the interactive program at the time of printing.

25. Video game apparatus as claimed in claim 23, wherein the gaming images include interaction information that can be utilized by the user to change, or continue along, the course of the interactive program.

26. Video game apparatus as claimed in claim 23, wherein the gaming images are indicative of successful completion of a predetermined task or level of the interactive program.

27. Video game apparatus as claimed in claim 26, wherein the gaming images take the form of one or more certificates.

28. Video game apparatus as claimed in claim 27, wherein the certificate includes information indicative of a score or a user that attained the certificate.

29. Video game apparatus as claimed in claim 23, wherein said one or more points are predetermined gaming events defined by the interactive program.

30. Video game apparatus as claimed in claim 23, wherein said one or more points are reached upon successful completion of a gaming goal by a user or users.

31. Video game apparatus as claimed in claim 30, wherein said print media is in the form of sheets of paper or card.

32. Video game apparatus as claimed in claim 31, wherein said sheets are substantially business card size.

33. Video game apparatus as claimed in claim 23, wherein said cartridge includes a print media feed roller device for interacting with the print media feed mechanism to feed media from the cartridge to the printhead as required.

34. Video game apparatus as claimed in claim 23, wherein said printhead comprises an inkjet printhead.

35. Video game apparatus as claimed in claim 34, wherein said ink jet printhead comprises a pagewidth array of ink ejection nozzles configured to selectively eject ink by means of a series of actuators.

36. Video game apparatus as claimed in claim 35, wherein said printhead is a microelectromechanical system (MEMS) printhead.

37. Video game apparatus as claimed in claim 36, wherein said actuators are thermal bend actuators.

38. Video game apparatus as claimed in claim 23, wherein said detachable storage means comprises a Digital Video Disk (DVD) executable by a DVD player module.

39. Video game apparatus as claimed in claim 23, wherein said detachable storage means comprises a Compact Disc-Read Only Memory (CD-ROM).

40. Video game apparatus as claimed in claim 23, wherein said detachable storage means comprises a semiconductor memory cartridge.

41. Video game apparatus as claimed in claim 23, wherein said communication means comprises a wireless communication system.

42. Video game apparatus as claimed in claim 23, including a detachable controller module incorporating a variety of interactive control devices.

43. Video game apparatus as claimed in claim 42, wherein said controller module is releasably connected with said console by means of a magnetic coupling.

44. A method of printing gaming information onto a substrate via a video gaming device, the video gaming device including:
- a receptacle for accepting detachable storage means, the detachable storage means containing an interactive program;
- communication means for receiving interaction data from at least one control device operable by a user;
- processing means; and
- a printer apparatus including a printhead, a replaceable cartridge and print media feed mechanism, an ink supply unit and print media supply housed jointly in said replaceable cartridge;
- the method including the steps of:
  - (a) executing the interactive program at least partly in reliance on the interaction data via said processing means, thereby to generate display images;
  - (b) outputting the display images for display on an image display means; and
  - (c) printing, under instruction from the processing means, one or more gaming images onto print media in response to execution of said interactive program.

45. A method according to claim 44, wherein the gaming images are different to the corresponding display images of the interactive program at the time of printing.

46. A method according to claim 45, wherein the gaming images include interaction information that can be utilized by the user to change, or continue along, the course of the interactive program.

47. A method according to claim 44, wherein the gaming images are indicative of successful completion of a predetermined task or level of the interactive program.

48. A method according to claim 47, wherein the gaming images take the form of one or more certificates.

49. A method according to claim 48, wherein the certificate includes information indicative of a score or a user that attained the certificate.

50. A method according to claim 44, wherein said one or more points are predetermined gaming events defined by the interactive program.

51. A method according to claim 44, wherein said one or more points are reached upon successful completion of a gaming goal by a user or users.

52. A method according to claim 51, wherein said print media is in the form of sheets of paper or card.

53. A method according to claim 52, wherein said sheets are substantially business card size.

54. A method according to claim 44, wherein said cartridge includes a print media feed roller device for interacting with the print media feed mechanism to feed media from the cartridge to the printhead as required.

55. A method according to claim 44, wherein said printhead comprises an inkjet printhead.

56. A method according to claim 55, wherein said ink jet printhead comprises a pagewidth array of ink ejection nozzles configured to selectively eject ink by means of a series of actuators.

57. A method according to claim 56, wherein said printhead is a microelectromechanical system (MEMS) printhead.

58. A method according to claim 57, wherein said actuators are thermal bend actuators.

59. A method according to claim 44, wherein said detachable storage means comprises a Digital Video Disk (DVD) executable by a DVD player module.

60. A method according to claim 44, wherein said detachable storage means comprises a Compact Disc-Read Only Memory (CD-ROM).

61. A method according to claim 44, wherein said detachable storage means comprises a semiconductor memory cartridge.

62. A method according to claim 44, wherein said communication means comprises a wireless communication system.

63. A method according to claim 44, including a detachable controller module incorporating a variety of interactive control devices.

64. A method according to claim 63, wherein said controller module is releasably connected with said console by means of a magnetic coupling.

* * * * *